April 9, 1963   S. NAPOLIN   3,085,182
ADJUSTABLE CAPACITORS
Filed Dec. 18, 1959

INVENTOR.
SEYMOUR NAPOLIN
BY
ATTORNEY

3,085,182
ADJUSTABLE CAPACITORS
Seymour Napolin, Westbury, N.Y., assignor to Granco Products, Inc., Long Island City, N.Y., a corporation of New York
Filed Dec. 18, 1959, Ser. No. 860,497
3 Claims. (Cl. 317—249)

This invention relates to adjustable capacitors especially of the type used as trimming condensers.

One of the objects of the invention is to provide a trimming condenser especially for frequency modulation tuners consisting of a relatively large adjustable capacitor of relatively small capacity, forming a unitary structure with a relatively small capacitor which is fixed and of relatively large capacity.

Another object of the invention is to provide on one of the electrodes of an adjustable capacitor an adjustment screw projecting therefrom and to arrange between that adjustment screw and that electrode a fixed capacity in the form of a washer arranged between screw and electrode.

Still another object of the invention is to provide a condenser of relatively large capacity in the form of a washer having electrode coatings applied to both sides thereof, one of said electrode coatings having a substantially larger radial extension than the other so that it may contact a screw head arranged thereon and be insulated from the screw bolt extending from said screw head through the opening of the washer.

Still another object of the invention is to provide an adjustable capacitor in the form of strips parallelly overlapping each other at one end thereof and fixedly attached at the other end thereof, and to provide a screw bolt adjustably attached to one of said strips and passing through the other strip, with its head permitting relative adjustment of the strips, and to arrange fixed capacity in the form of a washer between screw head and strip.

In a more specific embodiment of the invention, the washer type condenser has opposite electrode coatings the top coating being formed to contact the screw head while the bottom coating is so formed as to be insulated from the bolt extending from the screw head but at the same time to connect electrically to a strip.

Figure 1:
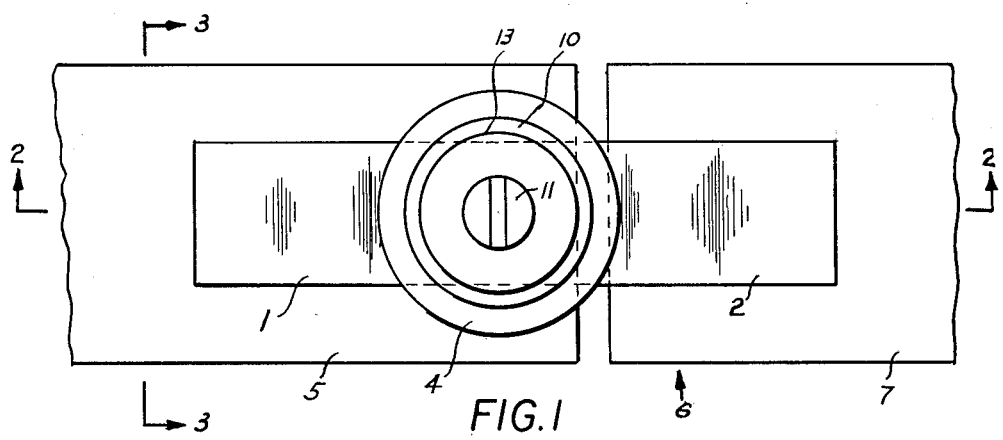
Figure 2:
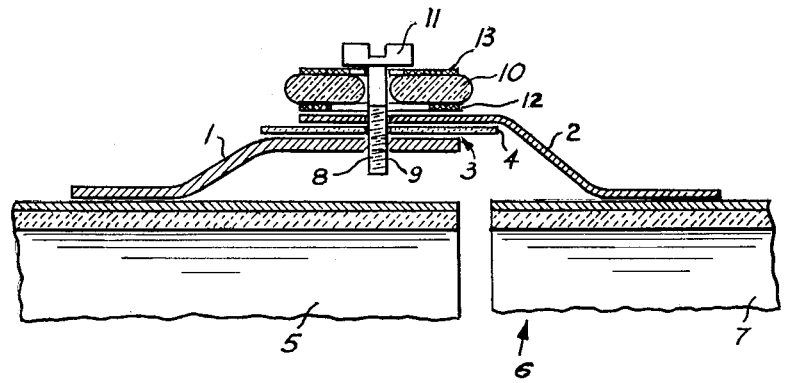

These and other objects of the invention will be more fully apparent from the drawings attached herewith in which FIGS. 1 and 2 represent in top and front elevations respectively, the latter in section, a capacitor assembly embodying certain principles of the invention.

Figure 3:
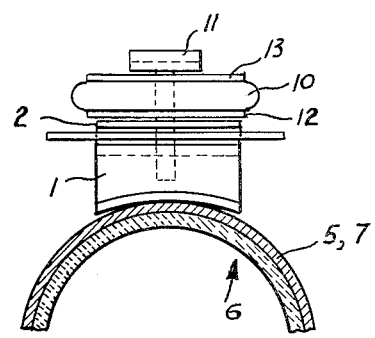

FIG. 3 in side elevation and in cross-section, represents an enlarged view of certain important parts of the assembly shown in FIGS. 1, 2 and 3.

In the drawings, an adjustable condenser such as used as a trimmer especially in a frequency modulation tuner, is shown in the form of two strips 1, 2 arranged at their inner ends overlapping substantially parallel to each other forming a condenser space 3 therebetween. In condenser space 3, there is arranged an insulating disc 4 consisting for example of mica and extending substantially beyond condenser space 3.

Bottom strip 1 is relatively rigid and its free end serves to be attached to a terminal, for example, the electrode 5 of a tuning condenser 6 for which it is used as a trimming condenser.

Top strip 2 consists of relatively flexible material and is also attached at free end to a terminal for example the electrode 7 of tuning condenser 6.

Adjustment of condenser 1, 2 is effected by means of a screw bolt 8 adjustable in a thread 9 provided at the inner end of bottom strip 1. Bolt 8 extends therefrom through mica disc 4, strip 2 and washer 10 and into a screw head 11. By turning screw head 11 the space between strips 1, 2 can be adjusted and trimming be effected.

Washer 10 in accordance with the invention is formed as a fixed condenser of relatively high k. and of a relatively high capacity consisting for example of barium titanate having electrode coatings on both sides thereof, schematically indicated in an exaggerated scale at 12, 13. Top coating 13 extends radially so far as to form electrical contact with the bottom of screw head 11.

Bottom coating 12 on the other hand does not extend radially so far; it only extends so far as to be insulated from bolt 8 while forming electrical contact with the upper surface of flexible strip 2.

Fixed capacitor 10 is for example of the order of a few tens of micromicrofarad, while the adjustable capacitor 1, 2 is of relatively low capacity of an order of a few micromicrofaradols. In a particular assembly for example, the adjustable capacitor has a capacity of the order of 1 to 8 mmfd., while the fixed condenser has a capacity of 30 mmfd.

In this way it is possible to obtain a capacity structure which is relatively insensitive to vibration and temperature changes and yet at the same time accurately adjustable within a desired top range.

Since the washer or donut capacity can be made of material with a definite temperature coefficient, temperature compensation may be automatically included. This replaces mica capacitors but in a much more miniature fashion and permits a greater accuracy of adjustment.

The invention is not limited to the particular combination of flexible and washer type capacitors shown and described nor to the particular connection, form and structure of the elements of the assembly but may be applied in any form or manner whatsoever without departing from the scope of this disclosure.

I claim:

1. In a capacitor structure, a pair of metallic strips arranged partially parallelly overlapping on one of their ends, forming a condenser space there-between of relatively low capacitance, and forming bent down terminals at their opposite ends; the upper one of said strips being more flexible than the other and the lower one of said strips having an adjustable screw bolt threaded therein at its overlapping end; said screw bolt extending from said lower strip through said condenser space and said upper strip, forming a screw head projecting therefrom; and a washer type capacitor of substantially homogeneous structure and of relatively high capacitance having a conductive coating on its top side in contact with said screw head and on its bottom side another conductive coating insulated from said screw bolt but in contact with said upper strip; said washer type capacitor being so arranged as to permit adjustment of said low capacitance space by rotating said screw head substantially without affecting the contact between said coatings and said electrode strip and screw head respectively.

2. Structure according to claim 1 wherein said other capacitor has a coating forming an electrode on its top side in contact with the coating of said screw head while its bottom has another electrode coating spaced from said screw bolt passing thereto but in contact with the top of said flexible strip.

3. Structure according to claim 1 wherein in said condenser space is arranged an insulating disk of a diameter substantially exceeding the extension of said space and projecting from said strips at both sides thereof.

References Cited in the file of this patent

UNITED STATES PATENTS

| 2,031,910 | Sickles | Feb. 25, 1936 |
| 2,759,155 | Hackenberg | Aug. 14, 1956 |

FOREIGN PATENTS

| 513,950 | Great Britain | Oct. 26, 1939 |